(12) United States Patent
Andrade et al.

(10) Patent No.: US 11,341,294 B2
(45) Date of Patent: May 24, 2022

(54) SYSTEMS AND METHODS FOR LEVEL SET DISCRETE ELEMENT METHOD PARTICLE SIMULATION

(71) Applicant: California Institute of Technology, Pasadena, CA (US)

(72) Inventors: Jose Andrade, Pasadena, CA (US); Reid Y. Kawamoto, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 535 days.

(21) Appl. No.: 15/874,769

(22) Filed: Jan. 18, 2018

(65) Prior Publication Data

US 2018/0203960 A1    Jul. 19, 2018

Related U.S. Application Data

(60) Provisional application No. 62/447,528, filed on Jan. 18, 2017.

(51) Int. Cl.
*G06F 30/20*    (2020.01)
*G06F 111/10*   (2020.01)

(52) U.S. Cl.
CPC .......... *G06F 30/20* (2020.01); *G06F 2111/10* (2020.01)

(58) Field of Classification Search
CPC ...................................................... G06F 30/20
See application file for complete search history.

(56) References Cited

U.S. PATENT DOCUMENTS

| 9,311,745 | B2 | 4/2016 | Andrade et al. |
| 2004/0090437 | A1 | 5/2004 | Uesaki et al. |
| 2007/0179685 | A1 | 8/2007 | Milam et al. |
| 2007/0219760 | A1 | 9/2007 | Yang et al. |

(Continued)

FOREIGN PATENT DOCUMENTS

| EP | 2116976 A2 | 11/2009 |
| WO | 2013106861 A1 | 7/2013 |

OTHER PUBLICATIONS

Zehetner, C., Schörgenhumer, M., Hammelmüller, F., & Humer, A. (2015). Comparison of Coupled Euler-Lagrange and Smoothed Particle Hydrodynamics in Fluid-Structure Interaction. In Proceedings of the VI International Conference on Computational Methods for Coupled Problems in Science and Engineering (Year: 2015).*

(Continued)

*Primary Examiner* — Bijan Mapar
(74) *Attorney, Agent, or Firm* — KPPB LLP

(57) ABSTRACT

Systems and methods for level set discrete element method particle simulation in accordance with embodiments of the invention are disclosed. In one embodiment, a particle simulation device includes a processor and a memory storing a particle analysis application, wherein the processor, on reading the particle analysis application obtains image data describing a plurality of particles, models a plurality of grains based on the image data, where each modeled grains includes a level set function corresponding to one of the plurality of particles, calculates the motion of each of the plurality of grains based on a force applied to the plurality of grains, and generates a transformed particle model based on the plurality of grains and the calculated motion.

18 Claims, 14 Drawing Sheets

(56) References Cited

U.S. PATENT DOCUMENTS

| | | | |
|---|---|---|---|
| 2011/0148865 | A1 | 6/2011 | Lim et al. |
| 2011/0202327 | A1* | 8/2011 | Yu .......................... G06F 30/23 703/9 |
| 2013/0185035 | A1 | 7/2013 | Andrade et al. |
| 2015/0284550 | A1* | 10/2015 | Guttag ....................... C08J 5/00 428/221 |
| 2015/0355158 | A1* | 12/2015 | Lander ................. G01N 33/383 702/2 |

OTHER PUBLICATIONS

Li et al., "Incremental 3D Collision Detection with Hierarchical Data Structures", Proceedings of the ACM Symposium on Virtual Reality Software and Technology, VRST, Nov. 2-5, 1998, pp. 139-144.
Lim et al., "Granular element method for three-dimensional discrete element calculations", International Journal for Numerical and Analytical Methods in Geomechanics, Feb. 2014, 22 pgs.
Lim et al., "Multiscale characterization and modeline of granular materials through a computational mechanics avatar: a case study with experiment", Acta Geotechnica, vol. 11, 2016, pp. 243-253.
Lim et al., "On the contact treatment of non-convex particles in the granual element method", Comp. Part. Mech., 2014, vol. 1, pp. 257-275.
Mindlin, "Compliance of Elastic Bodies in Contact", Journal of Applied Mechanics, 1949, vol. 71, pp. 259-268.
Moller, "A Fast Triangle-Triangle Intersection Test", Journal of Graphics Tools, 1997, vol. 2, pp. 25-30.
Morken et al., "Computing Intersections of Planar Spline Curves using Knot Insertion", Computer Aided Geometric Design (preprint), Mar. 2009, vol. 26, Issue 3, pp. 351-366, doi:10.1016/j.cagd.2008.07.005.
Muir Wood, Soil Behavior and Critical State Soil Mechanics, Chapters 4, 5, 6, Cambridge University Press, Cambridge, UK, 1990, pp. 84-174.
Osher et al., "Level Set Methods and Dynamic Implicit Surfaces", Springer, 2003, 290 pgs. (Presented in three parts).
O'Sullivan et al., "Chapter 4: Particle Types", Particulate Discrete Element Modelling, 2011, pp. 145-174.
Page et al., "Collision Detection Algorithm for NURBS Surfaces in Interactive Applications", Canadian Conference on electrical and Computer Engineering, Jun. 2003, pp. 1417-1420.
Parab et al., "Experimental assessment of fracture of individual sand particles at different loading rates", International Journal of Impact Engineering, Jun. 2014, vol. 68, pp. 8-14.
Pena et al., "Modeling Slow Deformation of Polygonal Particles Using DEM", Particulogy, Dec. 2008, vol. 6, Issue 6, pp. 506-514, arXiv:0712.0919.
Piegl et al., "The NURBS Book", 2nd Edition, Monographs In Visual Communication, Jul. 1996, Chapters 1-4, pp. 1-139.
Pournin et al., "A Generalization of Distinct Element Method to Tridimensional Particles with Complex Shapes", Infoscience, EPFL Scientific Publications, Jan. 2005, pp. 1-4.
Rhinoceros, www.rhino3d.com, Retrieved Jun. 1, 2012, 2 pgs.
Rothenburg et al., "Numerical Simulation of Idealized Granular Assemblies With Plane Elliptical Particles", Computers and Geotechnics, Dec. 1991, vol. 11, No. 4, pp. 315-329.
Sallam, "Studies on Modeling Angular Soil Particles Using the Discrete Element Method", Theses and Dissertations. Paper 1232, University of South Florida, Nov. 12, 2004, 229 pgs. (Presented in two parts).
Sammis et al., "The Kinematics of Gouge Deformation", Pageoph., 1987, vol. No. 5, pp. 777-812.
Schulz, "Bezier Clipping is Quadratically Convergent", Computer Aided Geometric Design, Jan. 2009, vol. 26, Issue 1, pp. 61-74.
Sederberg et al., "Curve Intersection Using Bezier Clipping", Computer-Aided Design, vol. 22, No. 9, Nov. 1990, vol. 22, No. 9, pp. 538-550.

Sederberg et al., "T-Spline Simplification and Local Refinement", ACM Transactions on Graphics, Aug. 2004, vol. 23, No. 3, pp. 276-283.
Senetakis et al., "The inter-particle coefficient of friction at the contact of Leighton Buzzard sand quartz minerals", The Japanese Geotechnical Society, Solis and Foundations, Sep. 2013, vol. 5, pp. 746-755.
Shen et al., "Modelling Rock Fracturing Processes", Springer, 2014, 579 pgs. (Presented in four parts).
Shene, "CS3621 Introduction to Computing with Geometry Notes", http:www.cs.mtu.edu/shene/COURSES/cs3621/NOTES, Last Updated May 4, 2011, 4 pgs.
Sintef, "SISL Homepage", httpwwwsintefno/sisl, Dec. 20, 2012, 2 pgs.
Skytt, "Challenges in Surface-Surface Intersections", Computational Methods for Algebraic Spline Surface, 2004, pp. 11-26.
Sukumaran et al., "Quantitative Characterisation of the Geometry of Discrete Particles", Geotechnique, 2001, vol. 51, pp. 1-9.
Tijskens et al., "Discrete Element Modelling for Process Simulation in Agriculture", Journal of Sound and Vibration, Sep. 18, 2003, vol. 266, Issue 3, pp. 493-514.
Ting et al., "An Ellipse-Based Discrete Element Model For Granular Materials", International Journal for Numerical and Analytical Methods in Geomechanics, Sep. 1993, vol. 17, No. 9, pp. 603-623.
Tu et al., "Criteria for Static Equilibrium in Particulate Mechanics Computations", International Journal for Numerical Methods in Engineering, Sep. 2008, vol. 75, pp. 1581-1606.
Vlahinic et al., "Towards a More Accurate Characterization of Granular Media: Extracting Quantitative Descriptors from Tomographc Images", Granular Matter, 2014, vol. 16, pp. 9-21.
Walton et al., "Simulation of Rotary-Drum and Repose Tests for Frictional Spheres and Rigid Sphere Clusters", Joint DOE/NFS Workshop on Flow of Particulates and Fluids, Ithaca, New York, Sep. 29-Oct. 1, 1993, pp. 1-17 (22 total pgs).
Weibull, "A statistical theory of strength of materials", in Proceeding of the Ingeniors Vetenskapsakad, vol. 151, Feb. 3, 1939, 51 pgs.
Weibull et al., "A Statistical Distribution Function of Wide Applicability", Journal of Applied Mechanics, vol. 18, Sep. 1951, pp. 293-297.
Zhao et al., "Three-dimensional Discrete Element Simulations for Granular Materials", Engineering Computations: International Journal for Computer-Aided Engineering and Software, 2006, vol. 23, No. 7, pp. 749-770.
International Search Report and the Written Opinion for International Application No. PCT/US2013/021493, Completed Apr. 30, 2013, dated Apr. 30, 2013, 7 pgs.
International Preliminary Reporton Patentability PCT/US2013/021493, report completed Jul. 24, 2014, 6 Pgs.
Alonso-Marroquin et al., "Calculation of the Incremental Stress-Strain Relation of a Polygonal Packing", Physical Review E, Sep. 2002, vol. 66, p. 021301-1-021301-11.
Andrade et al., "Granular Element Method (GEM): Linking Inter-Particle Forces With Macroscopic Loading", Granular Matter, vol. 14, 2012, pp. 51-61.
Andrade et al., "Granular Element Method for Computational Particle Mechanics", Computer Methods in Applied Mechanics and Engineering, Oct. 1, 2012, vol. 241-244, pp. 262-274.
Andrade et al., "Multiscale Framework for Behavior Prediction in Granular Media", Mechanics of Materials, 2009, vol. 41, pp. 652-669.
Andrade et al., "Multiscale Modeling and Characterization of Granular Matter From Grain Kinematics to Continuum Mechanics", Journal of the Mechanics and Physics of Solids, Feb. 2011, vol. 59, pp. 237-250.
Ashmawy et al., "Evaluating the Influence of Particle Shape on Liquefaction Behavior Using Discrete Element Modeling", Proceedings of the Thirteenth 2003 International Offshore and Polar Engineering Conference, Honolulu, Hawaii, USA, May 25-30, 2003, 8 pgs.
Babic, "Discrete Particle Numerical Simulation of Granular Material Behavior", Department of Civil and Environmental Engineering, Clarkson University, Report No. 88-11, Dec. 1988, pp. ii-92 (97 pgs).

(56) References Cited

OTHER PUBLICATIONS

Byerlee, "Friction of Rocks", Pure and Applied Geophysics, Jul. 1978, vol. 116, Issue 4-5, pp. 615-626.
Casini et al., "Breakage of an artificial crushable material under loading", Granular Matter, Oct. 2013, vol. 5, pp. 661-673.
Cho et al., "Particle Shape Effects on Packing Density, Stiffness, and Strength Natural and Crushed Sands", Journal of Geotechnical and Geoenvironmental Engineering, ASCE, May 2006, pp. 591-602.
Christoffersen et al., "A Micromechanical Description of Granular Material Behavior", Journal of Applied Mechanics, Jun. 1981, vol. 48, pp. 339-344.
Cil et al., "3D assessment of fracture of sand particles using discrete element method", Geotechnique Letters, Apr. 2013, vol. 2, pp. 161-166.
Cil et al., "3D evolution of sand fracture under 1D compression", Geotechnique, Apr. 2014, vol. 64, No. 5, pp. 351-364.
Cohen et al., "Geometric Modeling with Splines: An Introduction", A K Peters, Ltd, 2001, pp. 528-535.
Cox, "The Numerical Evaluation of B-Splines", IMA Journal of Applied Mathematics, Oct. 1, 1972, vol. 10, Issue 2, pp. 134-149.
Cundall, "Formulation of a Three-Dimensional Distinct Element Model—Part 1. A Scheme to Detect and Represent Contacts in a System Composed of Many Polyhedral Blocks", International Journal of Rock Mechanics, Mining Sciences and Geomechanics Abstracts, Jun. 1988, vol. 25, No. 3, pp. 107-116.
Cundall et al., "A Discrete Numerical Model for Granular Assemblies", Geotechnique, Mar. 1, 1979, vol. 29, No. 1, pp. 47-65.
De Boor, "On Calculating with B-Splines", Journal of Approximation Theory, Jul. 1972, vol. 6, pp. 50-62.
Dokken, "Finding Intersections of B-Spline Represented Geometries Using Recursive Subdivision Techniques", Computer Aided Geometric Design, Sep. 1985, vol. 2, Issues 1-3, pp. 189-195.
Dziugys et al., "An Approach to Simulate the Motion of Spherical and Non-Spherical Fuel Particles in Combustion Chambers", Granular Matters, Dec. 2011, vol. 3, Issue 4, pp. 231-265.
Ericson, "Real-Time Collision Detection", Morgan Kaufmann Publications, San Francisco, 2005, 633 pgs. (Presented in two parts).
Evans et al., "Singularity Free Algorithm for Molecular Dynamics Simulation of Rigid Polyatomics", Molecular Physics, Aug. 1977, vol. 34, No. 2, pp. 327-331.
Fisher et al., "If You Know B-Splines Well, You Also Know NURBS!", in ACM SIGCSE, Mar. 2004, vol. 36, No. 1, pp. 343-347.
Fu, "Experimental Quantification and DEM Simulation of Micro-Macro Behaviors of Granular Materials Using X-Ray Tomography Imaging", Dissertation, Louisiana State University, Agricultural and Mechanical College, and Department of Civil and Environmental Engineering. Dec. 2005, 269 pgs.
Garcia et al., "A Clustered Overlapping Sphere Algorithm to Represent Real Particles in Discrete Element Modelling", Geotechnique, Jan. 2009, vol. 59, No. 9, pp. 779-784.
Garcia et al., "Numerical Study of the effects of Particle Shape and Polydispersity on Permeability", Physical Review, Aug. 2009, vol. 80, p. 021304-1-021304-9.
Goldstein et al., "The Kinematics of Rigid Body Motion", Classical Mechanics, Chapter 4. 3rd Ed., Addison Wesley, 2001, pp. 134-181.
Harkness, "Potential Particles for Modelling of Interlocking Media in Three Dimensions", International Journal for Numerical Methods in Engineering, Jun. 23, 2009, vol. 80, pp. 1573-1594.
Hart et al., "Formulation of a Three-dimensional Distinct Element Model—Part II. Mechanical Calculations for Motion and Interaction of a System Composed of Many Polyhedral Blocks", International Journal of Rock. Mechanics, Mining Science and Geomechanics Abstracts, Jun. 1988, vol. 25, No. 3, pp. 117-125.
Hogue et al., "Efficient Computer Simulation of Moving Granular Particles", Powder Technology, Jan. 1994, vol. 78, Issue 1, pp. 51-66.
Hoskins et al., "A medium-scale direct friction experiment", International Journal of Rock Mechanics and Mining Science & Geomechanics Abstracts, Mar. 1968, vol. 5, Issue 2, pp. 143-154.
Houlsby, "Potential Particles: A Method for Modelling Non-Circular Particles in DEM", Computers and Geotechnics, Jul. 2009, vol. 36, pp. 953-959.
Hughes et al., "Isogeometric Analysis: CAD, Finite Elements, NURBS, Exact Geometry and Mesh Refinement", Computer Methods in Applied Mechanics and Engineering, Oct. 1, 2005, vol. 194, pp. 4135-4195. (Presented in two parts).
Jaeger, "Failure of rocks under tensile conditions", International Journal of Mock Mechanics and Mining Science and Geomechanics Abstracts, Apr. 1967, vol. 4, No. 2, pp. 219-227.
Kawamoto et al., "Level set discrete element method for three-dimensional computations with triaxial case study", Journal of Mechanics and Physics of Solids, Jun. 2016, Available online: Mar. 10, 2016, vol. 91, 1-13 pgs.
Krishnamurthy et al., "Performing Efficient NURBS Modeling Operations on the GPU", IEEE Transactions on Visualization and Computer Graphics, Jul./Aug. 2009, vol. 15, No. 4, pp. 257-268.
Krishnan et al., "An Efficient Surface Intersection Algorithm based on Lower Dimensional Formulation", ACM Transactions on Graphics, Jan. 1997, vol. 16, No. 1, pp. 74-106.
Laursen, "Computational Contact and Impact Mechanics: Fundamentals of Modeling Interfacial Phenomena in Nonlinear Finite Element Analysis", Springer, 2002, 466 pgs. (Presented in four parts).

\* cited by examiner

SYSTEMS AND METHODS FOR LEVEL SET DISCRETE ELEMENT METHOD PARTICLE SIMULATION

CROSS-REFERENCE TO RELATED APPLICATIONS

The instant application claims priority to U.S. Provisional Patent Application No. 62/447,528, entitled "Level Set Discrete Element Method for Three-Dimensional Computations" to Andrade et al., filed Jan. 18, 2017, the disclosure of which is hereby incorporated by reference in its entirety.

FIELD OF THE INVENTION

The present invention relates to particulate systems and more specifically to the simulation of particulate systems.

BACKGROUND

Particle morphology can be characterized, in general, by three properties: sphericity, roundness, and roughness. These properties are sometimes referred to by other names such as shape, angularity, and surface roughness, respectively. In either case, these properties are scale dependent, as they measure morphological characteristics at different length scales, with increased spatial resolution needed to measure roughness, for example. Particle morphology has been shown to be crucially important for macroscopic properties in granular materials. Some of the most critical macroscopic properties used in engineering and science are strength and permeability, and both of these are intimately affected by particle morphology. In the case of macroscopic strength, it has been determined that lack of sphericity, sharper angularity and increased roughness all lead to increased mobilized strength in granular materials. This macroscopic effect is due to micromechanical effects such as increased number of contact points. Therefore, accurate micromechanical models for granular materials should be able to correctly capture particle morphology if they are to correctly predict the macroscopic strength in real materials such as sands.

Clustering and polyhedra are currently two widely discussed techniques that can be used to capture three-dimensional particle morphology in natural materials. Clustering is relatively simple to implement but cannot represent particle curvature readily, which could impact contact properties such as normal and tangential forces, thereby potentially changing macroscopic response. On the other hand, polyhedra can represent complex geometrical entities fairly well (especially in two dimensions), but contact detection algorithms available for these geometrical entities are rather complex (especially in three dimensions) as they introduce the need to deal with face-to-node, node-to-node, and face-to-face contact.

New characterization tools such as X-ray computed tomography (CT) enable direct measurement of particle morphology, as a function of imaging resolution. Generally, X-ray CT utilizes computer-processed X-rays to produce tomographic images or cross-sectional images of a particle non-destructively. Although, the resulting images provide accurate measurements of particle morphologies, current techniques such as clustering and polyhedral based methods are limited in their ability to capture particle morphology for the purpose of performing quantitative analysis of macroscopic response.

SUMMARY OF THE INVENTION

Systems and methods for level set discrete element method particle simulation in accordance with embodiments of the invention are disclosed. In one embodiment, a particle simulation device includes a processor and a memory storing a particle analysis application, wherein the processor, on reading the particle analysis application obtains image data describing a plurality of particles, models a plurality of grains based on the image data, where each modeled grains includes a level set function corresponding to one of the plurality of particles, calculates the motion of each of the plurality of grains based on a force applied to the plurality of grains, and generates a transformed particle model based on the plurality of grains and the calculated motion.

In an additional embodiment, the image data is obtained from an imaging device.

In another embodiment, the image data is captured using x-ray computed tomographic techniques.

In yet another additional embodiment of the invention, the modeled grain includes an interpolation of the level set function.

In still another additional embodiment of the invention, at least one master grain in the plurality of grains include a set of nodes.

In yet still another additional embodiment of the invention, the processor further identifies a master grain within the plurality of grains, identifies a slave grain within the plurality of grains, and determines contact between the master grain and the slave grain by calculating the penetration distance between at least one node of the master grain and the level set function of the slave grain.

In yet another embodiment of the invention, the motion of the master grain and the slave grain is calculated based on the contact between the master grain and the slave grain.

In still another embodiment of the invention, the processor further generates a model of a flexible container and the plurality of grains are located within the modeled container.

In yet still another embodiment of the invention, the processor further calculates a shear banding in the transformed particle model.

In yet another additional embodiment of the invention, the force includes a displacement in three dimensions.

Still another embodiment of the invention includes a method for simulating particle interactions including obtaining image data describing a plurality of particles using a particle simulation device including a processor and a memory, modeling a plurality of grains based on the image data using the particle simulation device, where each modeled grains includes a level set function corresponding to one of the plurality of particles, calculating the motion of each of the plurality of grains based on a force applied to the plurality of grains using the particle simulation device, and generating a transformed particle model based on the plurality of grains and the calculated motion using the particle simulation device.

In yet another additional embodiment of the invention, the image data is obtained from an imaging device.

In still another additional embodiment of the invention, the image data is captured using x-ray computed tomographic techniques.

In yet still another additional embodiment of the invention, the modeled grain includes an interpolation of the level set function.

In yet another embodiment of the invention, at least one master grain in the plurality of grains include a set of nodes.

In still another embodiment of the invention, the method further includes identifying a master grain within the plurality of grains using the particle simulation device, identifying a slave grain within the plurality of grains using the particle simulation device, and determining contact between the master grain and the slave grain by calculating the penetration distance between at least one node of the master grain and the level set function of the slave grain using the particle simulation device.

In yet still another embodiment of the invention, the motion of the master grain and the slave grain is calculated based on the contact between the master grain and the slave grain.

In yet another additional embodiment of the invention, the method further includes generating a model of a flexible container using the particle simulation device, wherein the plurality of grains are located within the modeled container.

In still another additional embodiment of the invention, the method further includes calculating a shear banding in the transformed particle model using the particle simulation device.

In yet still another additional embodiment of the invention, the force includes a displacement in three dimensions.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Figure 1:
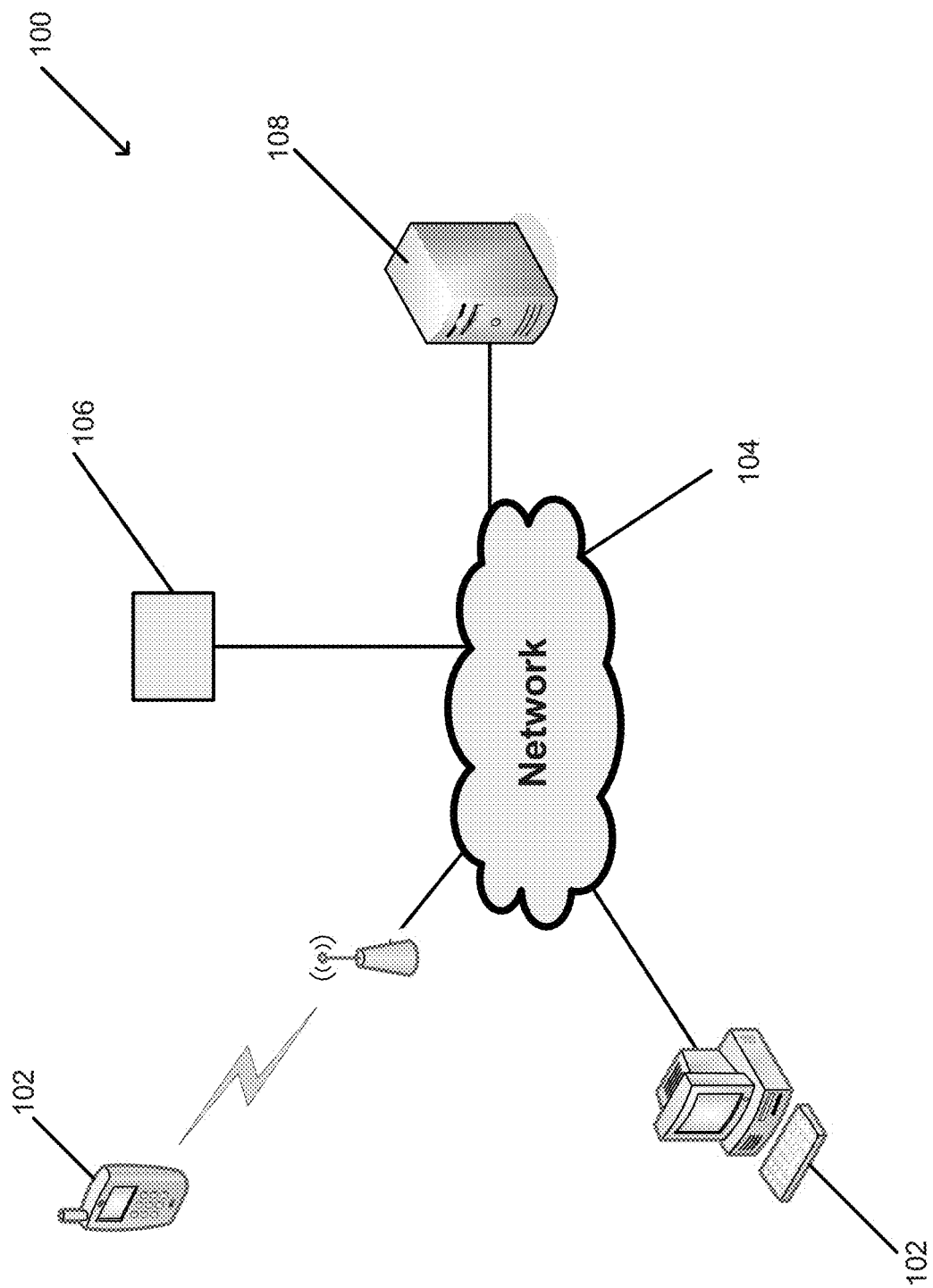
FIG. 1 is a conceptual illustration of a particle simulation system in accordance with an embodiment of the invention.

Turning now to the drawings, systems and methods for level set discrete element method particle simulation in accordance with various embodiments of the invention are illustrated.

In many embodiments, a level set (LS) discrete element method (DEM, together LS-DEM) process is utilized to analyze particulate systems. LS-DEM processes are particularly well suited for modeling any shape including (but not limited to) convex and/or nonconvex shapes. LS-DEM utilizes level set functions to model particles with arbitrary shape, unlike traditional DEM approaches which typically simplify particle shapes using spheres (or discs), ellipsoids, or polyhedral functions. A level set function can include a function whose value is a signed distance from a point. In a variety of embodiments, these functions are scalar valued. In some embodiments, LS functions can be implemented as a grid of points, where each point has a value corresponding to its distance from the edge of a grain particle. Points outside the grain can have positive values and points inside the grain can have negative values, although any value can be assigned to the points as appropriate to the requirements of specific applications of embodiments of the invention. As described herein a variety of particle simulation processes (including but not limited to LS-DEM) generally start with the underlying assumption that particles are discrete elements and compute the motion and effect of a large number of such particles. Particle simulation processes can calculate the forces that act on each individual particle using initial data, relevant physical laws, and LS functions for each particle. All the forces can be added together to find the total force acting on each particle and an integration method computes the change in the position and the velocity of each particle during a particular time step. The resulting new positions of the particles can be used to compute forces for the next time step and the process can be repeated until the predetermined time period for the simulation is completed.

LS function representations of grains within a particulate system can be obtained based on images captured using a variety of techniques, such as a computed tomography (CT) and/or other non-destructive imaging techniques. Once a model has been formed, various techniques can be used to determine contact points, forces, and moments between particles in contact. A node-to-surface contact process can be used in a variety of embodiments to determine if contact has been made between two grains by comparing a seeded node on a master particle to the boundary of a slave particle. The use of LS functions as particle models allows the use of LS-DEM techniques to efficiently calculate if such a contact has been made, including (but not limited to) contact with a nonconvex particle surface.

A variety of prior art systems utilize various techniques to capture particle shape, such as sphere clumping, polyhedral modeling, ellipsoid modeling, and non-uniform rational basis spline (NURBS) modeling. While clumping- and polyhedra-based techniques can approximate the volume and general shape of sand particles, it has been shown experimentally and computationally that not only do the overall shape of particles ("sphericity") affect bulk granular behavior, but surface curvature at a lower, local scale ("roundness") also affects behavior. Clumping methods usually underestimate, while polyhedra and ellipsoid-based techniques overestimate roundness unless a computationally inefficient number of spheres or vertices are used. NURBS-based techniques accurately capture particle shape at both length scales and can accurately simulate granular behavior in shear bands, but are computationally time-expensive and have only been able to simulate unit cells of about one thousand particles at most. In contrast, particle simulation systems and processes in accordance with various embodiments of the invention are able to both characterize and simulate the behavior of granular assemblies that characterizes particle shapes directly from experimental images, can simulate laboratory-scale amounts of particles (typically over 100,000), and model the same 3D strain localization trends.

Particle Simulation Systems

Particle simulation systems in accordance with many embodiments of the invention can transmit a variety of data between an imaging device and a computing system. A conceptual illustration of a particle simulation system in accordance with an embodiment of the invention is shown in FIG. 1. The particle simulation system 100 includes particle simulation device 102 that can communicate with imaging device 106 and/or database system 108 via network 104. In a variety of embodiments, the particle simulation device 102 communicates directly with the imaging device 106. Particle simulation device 102 can be any of a variety of computing systems including (but not limited to) desktop computers, cellular telephones, and/or tablet computers as appropriate to the requirements of specific applications of embodiments of the invention. In several embodiments, imaging device 106 captures images of particulate systems and can include (but is not limited to) an x-ray CT scanning device. Particle simulation device 102 can perform calculations on images captured by imaging device 106 to generate LS functions for grain particles in a particulate sample. In many embodiments, particle simulation device 102 receives data from a remotely located imaging device 106. Database system 108 can store any of a variety of data utilized in particle simulation processes including, but not limited to, level set functions for particulate systems, track particulate systems in a physical location over time, and/or store any of a variety of other data used during the calculation of contact between particles.

Although a specific architecture of a particulate analysis system in accordance with embodiments of the invention are illustrated in FIG. 1, a variety of architectures, including imaging devices and other sensors, devices, and techniques not specifically described herein, can be utilized in accordance with various embodiments of the invention. In particular, although the illustrated embodiment shows the particle simulation device, imaging device, and database system as separate devices, the particle simulation device, imaging device, and/or database system can be implemented using a single and/or multiple systems as appropriate to the requirements of specific applications of embodiments of the invention. Furthermore, the processes described herein can be performed using any combination of the computing systems, imaging devices, and/or database systems as appropriate to the requirements of specific applications of embodiments of the invention.

Particle Simulation Devices

Figure 2:
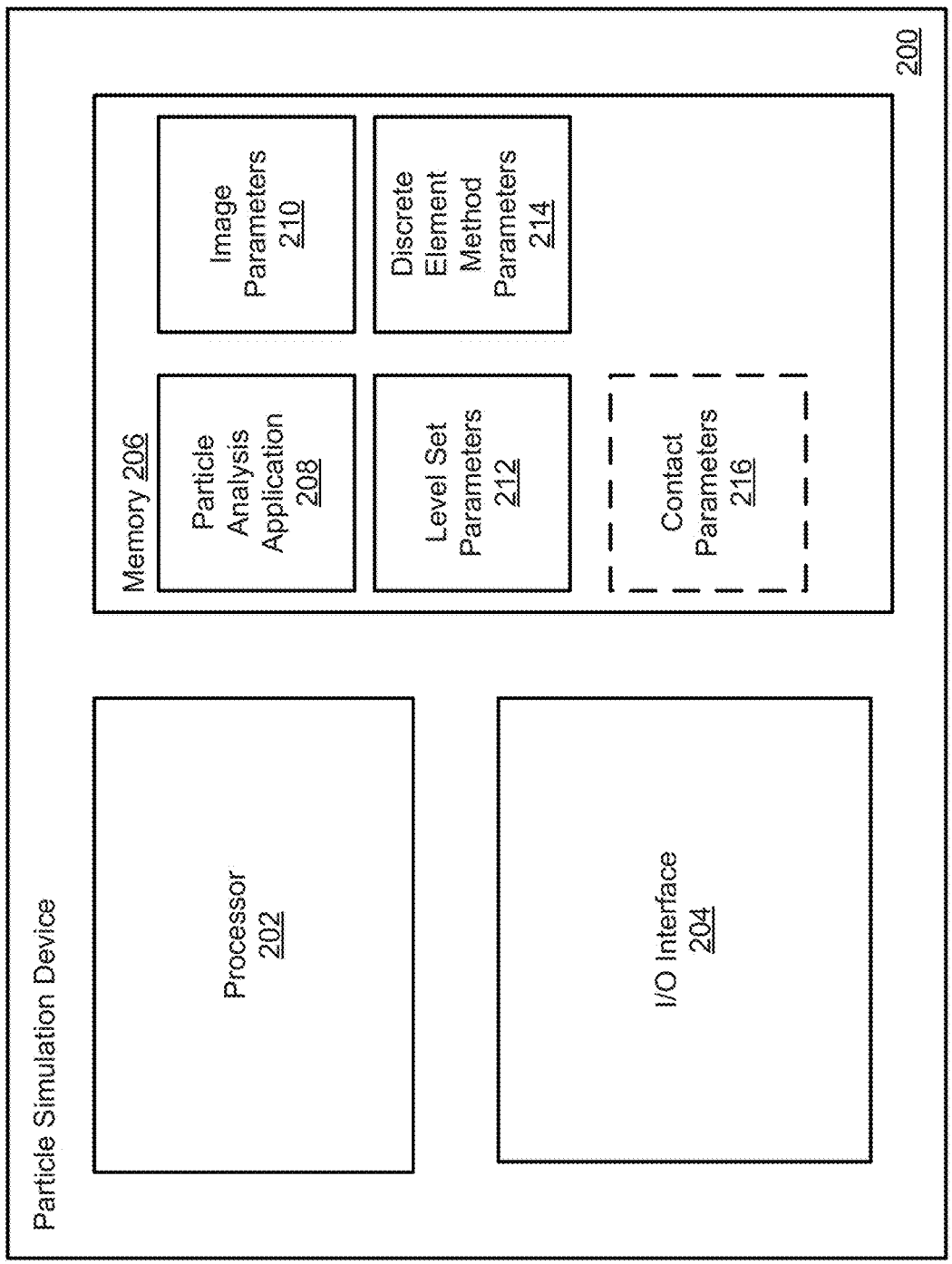
FIG. 2 is a conceptual illustration of a particle simulation device in accordance with an embodiment of the invention.

Particle simulation devices in accordance with several embodiments of the invention can generate level set particle morphologies and determine contact between particles. A conceptual illustration of a particle simulation device in accordance with an embodiment of the invention is shown in FIG. 2. The particle simulation device 200 includes at least one processor 202, I/O interface 204 and memory 206. The processor 202 can perform calculations on and make changes to data passing through the I/O interface as well as to data stored in memory. In some embodiments, data from imaging devices can be received through the I/O interface. In many embodiments, the memory 206 includes particle analysis application 208, image parameters 210, level set parameters 212, discrete element method parameters 214, and/or contact parameters 216. The particle analysis application 208 can, when read by the processor 202, cause the processor 202 to perform a variety of particle simulation processes. Image parameters 210 can include data received from an imaging device and can include two-dimensional and/or three-dimensional data. Level set parameters 212 can include (but are not limited to) level set functions for each grain modeled in the system.

In several embodiments, discrete element method parameters 214 can include a variety of data relating to a particle including (but not limited to) forces acting on individual particles and/or tracked movement of particles over sequential time steps. Contact parameters 216 can include any of a variety of information relating to the calculation of a contact between two grains including (but not limited to) contact points between particles and/or determined contacts after grain movement.

A number of different particle simulation devices are discussed herein with reference to FIG. 2; however, any of a variety of computing systems, including those that store some or all of the data illustrated in FIG. 2 on external systems and receive the data using I/O interface 204, can be utilized as appropriate to the requirements of specific applications in accordance with many embodiments of the invention. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Simulating Particle Systems

Particle simulation processes can include generating models that simulate the kinematics and mechanics of a system of discrete particles with the ability to capture arbitrary shape. As particle shape plays an enormous role in determining the macroscopic properties of a model, particularly strength, accounting for particle shape is paramount. A variety of particle simulation processes include generating level set functions to model individual grains within the model. Level set functions allow for high fidelity shape representation and are able to capture the complex morphology of real granular materials. In a number of embodiments, particle simulation processes include obtaining images of grains and generating level set functions representing the imaged grains. For example, recent developments in the characterization of grain assemblies from x-ray computed tomographic (XRCT) images of granular systems using level set imaging methods are particularly well suited for generating models simulating the granular assemblies as the level set data from the characterization of XRCT images can be utilized as an input, avoiding the need to switch geometric formulations. The level set framework is computationally efficient, even at high resolutions, due to its formulation.

Figure 3:
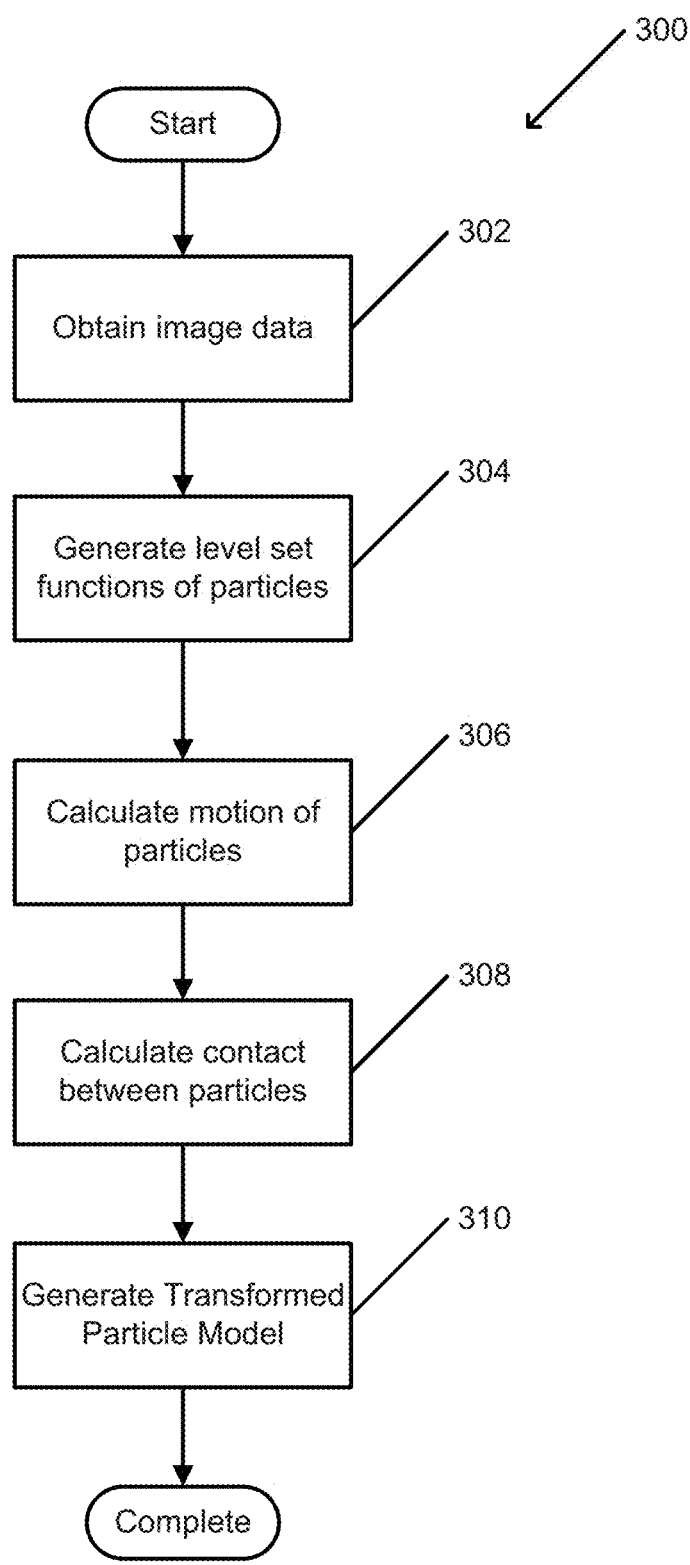
FIG. 3 is a flowchart conceptually illustrating a process for simulating granular materials in accordance with an embodiment of the invention.

Turning now to FIG. 3, a process for simulating granular assemblies in accordance with an embodiment of the invention is illustrated. The process 300 includes receiving (302) one or more images of a particle system. Level set functions can be generated (304) to model particle morphology for one or more particles. The motion of one or more particles can be calculated (306). In several embodiments, this calculation can be performed using a variety of particle simulation processes described herein. Contacts between several particles and/or a particle and a surface can be calculated (308) and a transformed particle model is generated (310).

Although a number of different particle analysis processes are discussed herein with respect to FIG. 3, any of a variety of processes can be utilized, particularly those that obtain images using imaging techniques other than x-ray computed tomography, as appropriate to the requirements of specific applications in accordance with several embodiments of the invention.

Generating Simulated Grains

Traditional particle analysis methods rely on modeling particles as uniform shapes such as spheres and/or combinations of uniformly shaped particles. However, particles occurring in nature are rarely uniform shape, and particle simulation processes can include modeling particle systems with arbitrary shaped particles. In a number of embodiments, particle simulation processes utilize a level set function that is a scalar-valued implicit function (p) whose value is the signed distance from a point p to an interface. In several embodiments, the interface is the particle's surface. Through interpolation of values at surrounding grid points, the value of the level set function at any point can be evaluated. The outside of the grain can be defined as $$\Omega^+ = \{p | \varphi(p) > 0\}$$

and the inside of the grain can be defined as $$\Omega^- = \{p | \varphi(p) < 0\}.$$

The original grain surface can be reconstructed by finding the set of points $\partial\Omega = \{p | \varphi(p) = 0\}$ (the "zero level set") via interpolation.

Figure 4A:
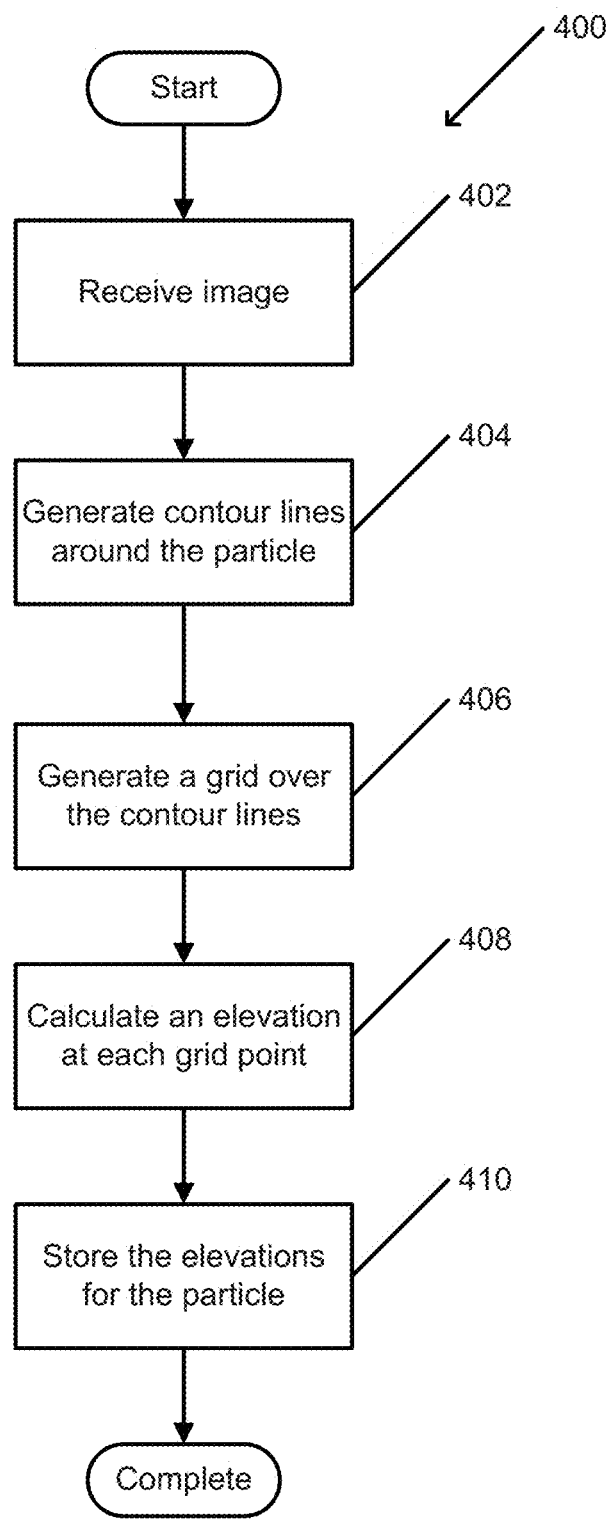
FIG. 4A is a flowchart conceptually illustrating a process for generating a simulated grain in accordance with an embodiment of the invention.
Figure 4B:
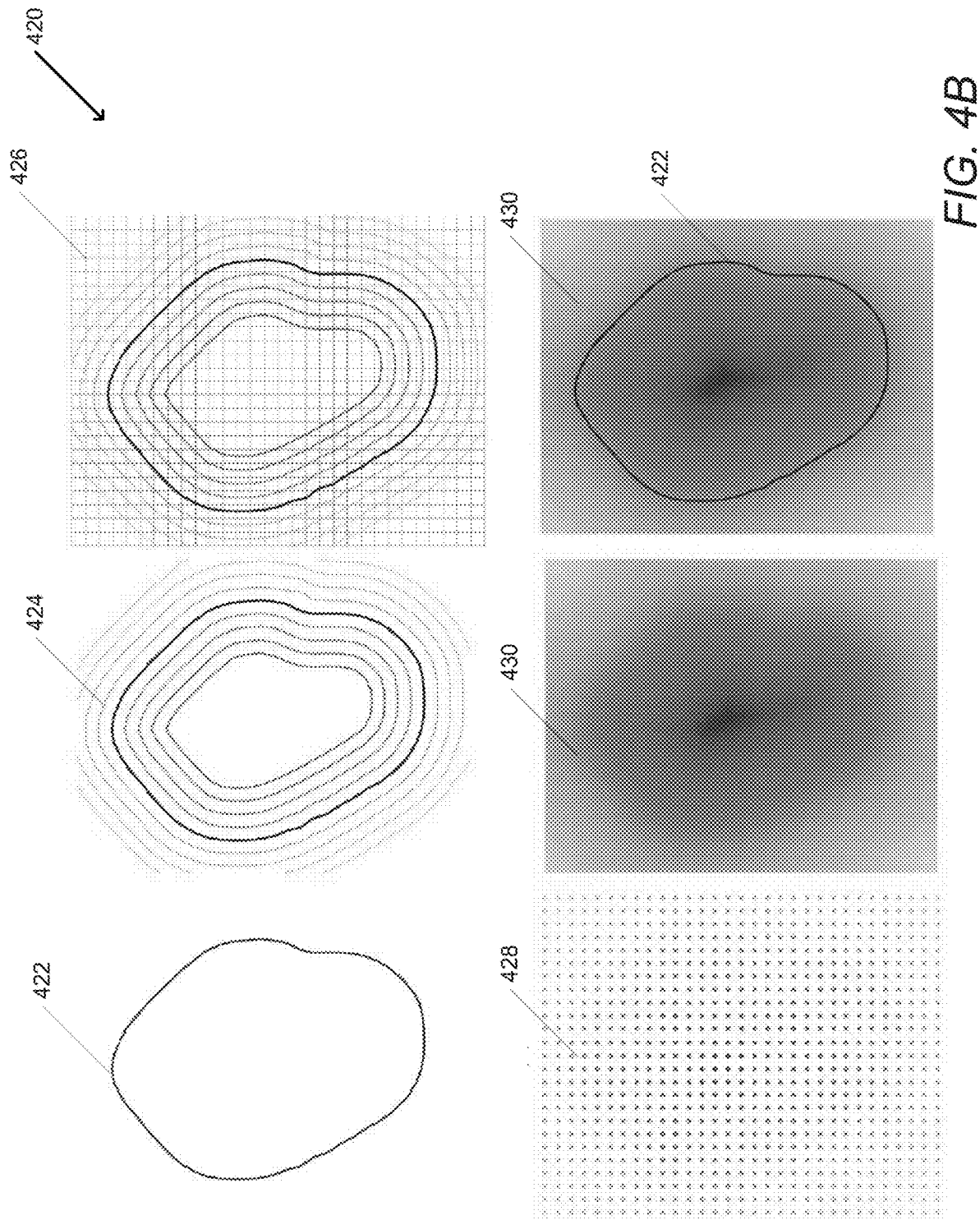
FIG. 4B is a conceptual illustration of a level set function representing a grain in accordance with an embodiment of the invention.

Turning now to FIG. 4B, a conceptual illustration of the generation of a level set function for a grain in accordance with an embodiment of the invention is shown. Level set function 420 includes a grain particle surface 422. Contour lines 424 represent a distance from a surface. In many embodiments, the contour lines are signed. The grain particle surface 422 and contour lines 424 can be superimposed on grid 426. Discrete level set function 428 can be generated based on the grid 426 along with the contour lines 424 and/or grain particle surface 422. An interpolation 430 of the level set function can be calculated between the grid 426. Additionally, the original grain surface 422 can be recreated based on the interpolation 430. It should be noted that, in the illustrated embodiments, the level set functions shown here are 2D for illustrative purposes only and can be calculated in 3D as appropriate to the requirements of specific applications of embodiments of the invention.

Particle simulation processes in accordance with some embodiments of the invention calculate two quantities from a level set function $\varphi$: its value $\varphi(p)$ and its gradient $\nabla\varphi(p)$ at any point p within its grid boundaries. This can be done through interpolation of values of the discretized level set function at grid points surrounding p. It should be readily apparent to one having ordinary skill that any of a variety of types of interpolation can be used including (but not limited to) linear interpolation, piecewise constant interpolation, polynomial interpolation, and/or spline interpolation.

As an illustrative example, calculations using linear interpolation are as follows: Let $\varphi$ be stored on a uniform grid with grid spacing g in all directions, p be a point in space with components $p_x$, $p_y$, and $p_z$ and surrounded by grid points $p_{abc}$ with a, b, c $\in \{0,1\}$. Furthermore, let $p_{000}$ have components $(x_0, y_0, z_0)$.

$$x = \frac{(p_x - x_0)}{g}, \ y = \frac{(p_y - y_0)}{g}, \ z = \frac{(p_z - z_0)}{g}$$

Figure 4C:
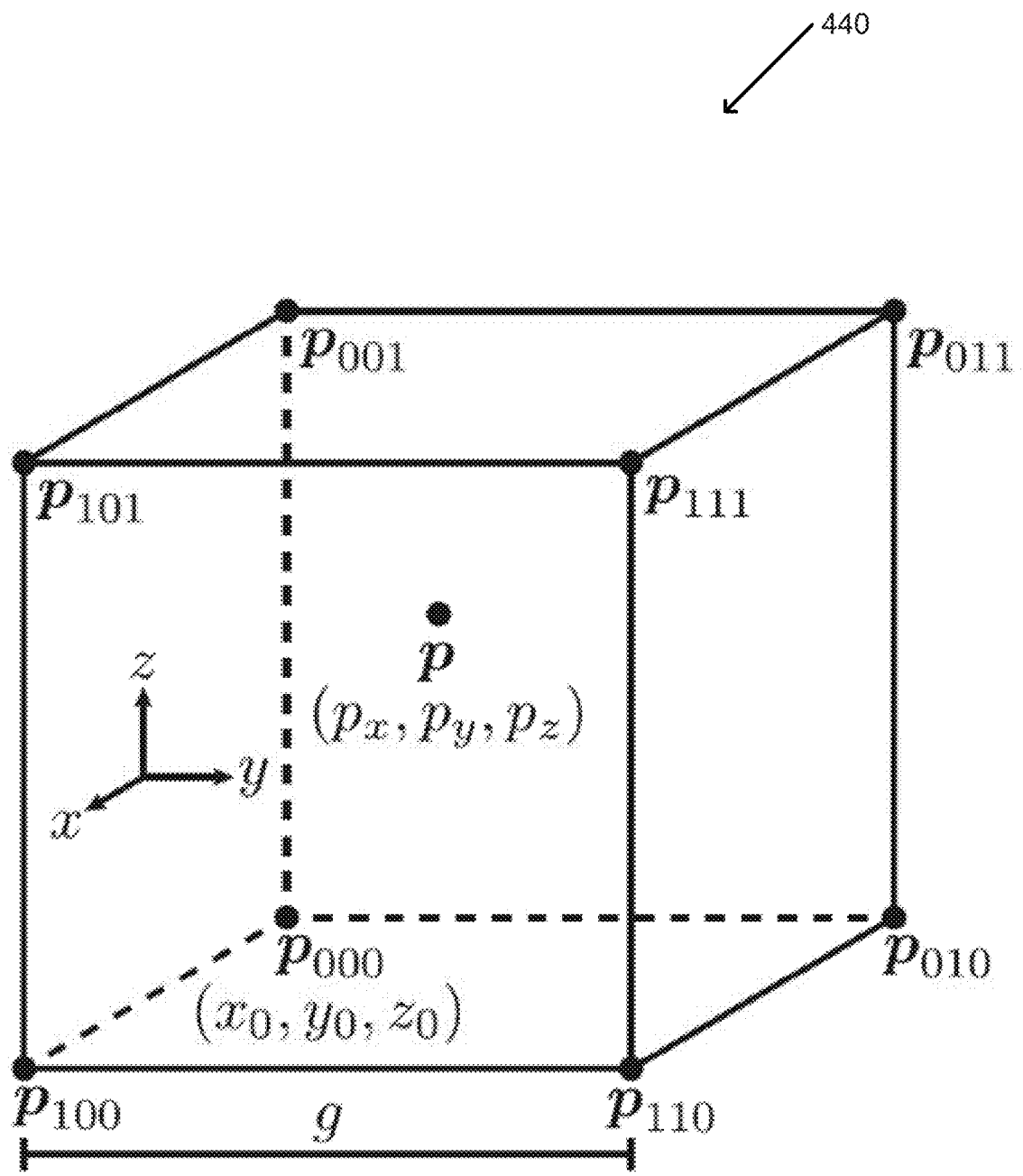
FIG. 4C is a conceptual schematic of a point in space with adjacent points in accordance with an embodiment of the invention.

$\varphi_{abc} = \varphi(p_{abc})$ for convenience in notation. FIG. 4C is a conceptual schematic 440 of point p with surrounding grid points in accordance with an embodiment of the invention.

Trilinear interpolation can be used to find $\varphi(p)$:

$$\varphi(p) = \Sigma_{a=0}^{1} \Sigma_{b=0}^{1} \Sigma_{c=0}^{1} \varphi_{abc}[(1-a)(1-x)+ax][(1-b)(1-y)+by][(1-c)(1-z)+cz]$$

The gradient of the level set function $\nabla\varphi(p)$, using trilinear interpolation is $$\nabla\phi(p) = \begin{pmatrix} \sum_{a=0}^{1}\sum_{b=0}^{1}\sum_{c=0}^{1} \phi_{abc}(2a-1)[(1-b)(1-y)+by][(1-c)(1-z)+cz] \\ \sum_{a=0}^{1}\sum_{b=0}^{1}\sum_{c=0}^{1} \phi_{abc}[(1-a)(1-x)+ax](2b-1)[(1-c)(1-z)+cz] \\ \sum_{a=0}^{1}\sum_{b=0}^{1}\sum_{c=0}^{1} \phi_{abc}[(1-a)(1-x)+ax][(1-b)(1-y)+by](2c-1) \end{pmatrix}$$

It can be noted that the interpolation functions to find $\varphi(p)$ and $\nabla\varphi(p)$ are not functions of grid size. Therefore, the time complexity of these calculations are constant; they do not increase if $\varphi$ is refined to a finer grid.

Inertial properties, for example (but not limited to) mass, center of mass, and/or moment of inertia of a given grain can be calculated for use in particle simulation processes. In some embodiments, these quantities can be computed directly from the grain's level set function. The smoothed Heaviside function $H(\varphi)$ can be defined as $$H(\phi) = \begin{cases} 0 & \text{if } \phi < -\epsilon \\ \frac{1}{2}\left(1 + \frac{\phi}{\epsilon} + \frac{\sin\frac{\pi\phi}{\epsilon}}{\pi}\right) & \text{if } -\epsilon < \phi < \epsilon \\ 1 & \text{if } \phi > \epsilon \end{cases}$$

where $\epsilon$ is a smoothness parameter. In several embodiments, $\epsilon = 1.5$ can be used as an illustrative example, but it should be readily apparent to one having ordinary skill that any of a variety of smoothing parameters can be utilized as appropriate to many embodiments of the invention. Additionally, the mass of a grain of uniform density p and grid spacing g represented by level set function is $$m = \rho g^3 \sum_{i=1}^{I} \sum_{j=1}^{J} \sum_{k=1}^{K} H(-\varphi(x_i, y_j, z_k))$$

where $\varphi(x_i, y_j, z_k)$ is the value of $\varphi$ at grid point $(x_i, y_j, z_k)$, and I, J, and K the number of grid points in the x, y, and z directions, respectively, of $\varphi$. In other words, in some embodiments, the mass is proportional to the summation of $H(-\varphi)$ over every grid point of $\varphi$. The components of its center of mass are:

$$c_x = \frac{\rho g^3}{m} \sum_{i=1}^{I} \sum_{j=1}^{J} \sum_{k=1}^{K} H(-\phi(x_i, y_j, z_k)) x_i$$

$$c_y = \frac{\rho g^3}{m} \sum_{i=1}^{I} \sum_{j=1}^{J} \sum_{k=1}^{K} H(-\phi(x_i, y_j, z_k)) y_i$$

$$c_z = \frac{\rho g^3}{m} \sum_{i=1}^{I} \sum_{j=1}^{J} \sum_{k=1}^{K} H(-\phi(x_i, y_j, z_k)) z_i$$

Additionally, the components of its moments of inertia are:

$$I_{11} = \rho g^3 \sum_{i=1}^{I} \sum_{j=1}^{J} \sum_{k=1}^{K} H(-\phi(x_i, y_j, z_k))[(y_i - c_y)^2 + (z_k - c_z)^2]$$

$$I_{22} = \rho g^3 \sum_{i=1}^{I} \sum_{j=1}^{J} \sum_{k=1}^{K} H(-\phi(x_i, y_j, z_k))[(x_i - c_x)^2 + (z_k - c_z)^2]$$

$$I_{33} = \rho g^3 \sum_{i=1}^{I} \sum_{j=1}^{J} \sum_{k=1}^{K} H(-\phi(x_i, y_j, z_k))[(x_i - c_x)^2 + (y_i - c_y)^2]$$

$$I_{23} = I_{32} = \rho g^3 \sum_{i=1}^{I} \sum_{j=1}^{J} \sum_{k=1}^{K} H(-\phi(x_i, y_j, z_k))(y_i - c_y) + (z_k - c_z)$$

$$I_{13} = I_{31} = \rho g^3 \sum_{i=1}^{I} \sum_{j=1}^{J} \sum_{k=1}^{K} H(-\phi(x_i, y_j, z_k))(x_i - c_x) + (z_k - c_z)$$

$$I_{12} = I_{21} = \rho g^3 \sum_{i=1}^{I} \sum_{j=1}^{J} \sum_{k=1}^{K} H(-\phi(x_i, y_j, z_k))(x_i - c_x) + (y_i - c_y)$$

Turning now to FIG. 4A, a process for generating a level set function for a particle of arbitrary shape in accordance with an embodiment of the invention is illustrated. The process 400 includes receiving (402) an image of a particle. Contour lines can be generated (404) around the particle. In many embodiments, contour lines can be distributed both within the boundary of a particle and exterior to the boundary of a particle.

A grid can be generated (406) over the contour lines. An elevation can be calculated (408) at each point in the grid. In some embodiments, the elevation value can correspond to the distance from the grid point to the particle boundary. In various embodiments, elevations external to the particle can have positive values and/or elevations internal to the particle can have negative values. However, this is merely illustrative and any system for assigning values to elevations can be utilized as appropriate to the requirements of specific embodiments of many inventions. Elevations can be stored (410) for each particle in the memory of a computer system and/or a database system.

In the special case of particles having uniform shape, each particle has substantially the same LS function. In this case, a single LS function for all particles and the location of each particle can be stored for computational ease. It should be readily appreciated by one having ordinary skill in the art that level sets can be constructed from several images by using any of a variety of image processing techniques to identify a particle across several images and/or piece together images to generate a larger particle image.

A variety of processes for generating models for grains within particle models are discussed herein with respect to FIGS. 4A-C; however, any of a variety of processes, including those capable of generating level set functions for particles and those utilizing alternative techniques for calculating inertial properties, can be utilized as appropriate to the requirements of specific applications of in accordance with many embodiments of the invention.

Calculating Grain Interactions

As particles in a system move over time, it is of particular interest to determine when and/or where particles make contact with each other. In a variety of embodiments, particle simulation processes can include calculating contact between simulated grains by determining node-to-surface contact. Grain i can have nodes $m_a^i$ with $\{a \in \mathbb{Z} \mid 1 \leq a \leq A\}$, where A is the number of nodes seeded onto i. FIG. 5B is a conceptual illustration 520 of an interpolation 526 of a grain 522 with nodes 524 located on the surface of grain 522 in accordance with an embodiment of the invention.

Contact can be determined between master grain i and slave grain j by checking all nodes $m_a^i$ of grain i with the level set function $\varphi^j$ of grain j. Then, $$d_a^{j,i} = \phi^j(m_a^i)$$

$$\hat{n}_a^{j,i} = \frac{\nabla \phi^j(m_a^i)}{\|\nabla \phi^j(m_a^i)\|}$$

where $d_a^{j,i}$ and $\hat{n}_a^{j,i}$ are the penetration distance and outward contact normal of j, respectively, between grains i and j at node $m_a^i$. These contact equations can be simple and easy to compute due to the formulation of the level set function, whose value at any point represents the distance from that point to the surface, and its gradient at any point represents, in principle, the unit outward normal at that point. However, due to the level set function's discrete nature, the magnitude of $\nabla \varphi^j(m_a^i)$ is very close, but not equal, to unity and therefore is normalized.

Figure 5A:
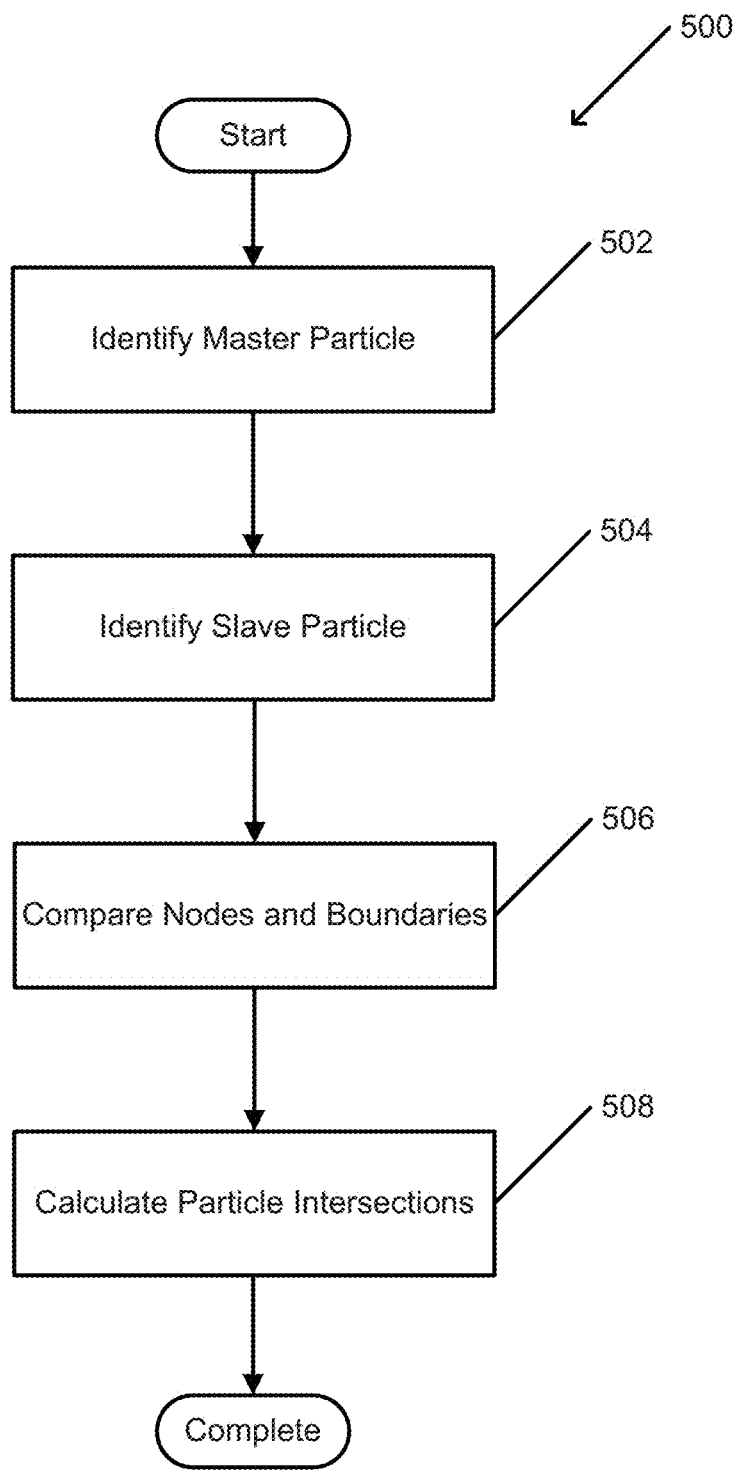
FIG. 5A is a flowchart conceptually illustrating a process for calculating contact between simulated grains in accordance with an embodiment of the invention.
Figure 5B:
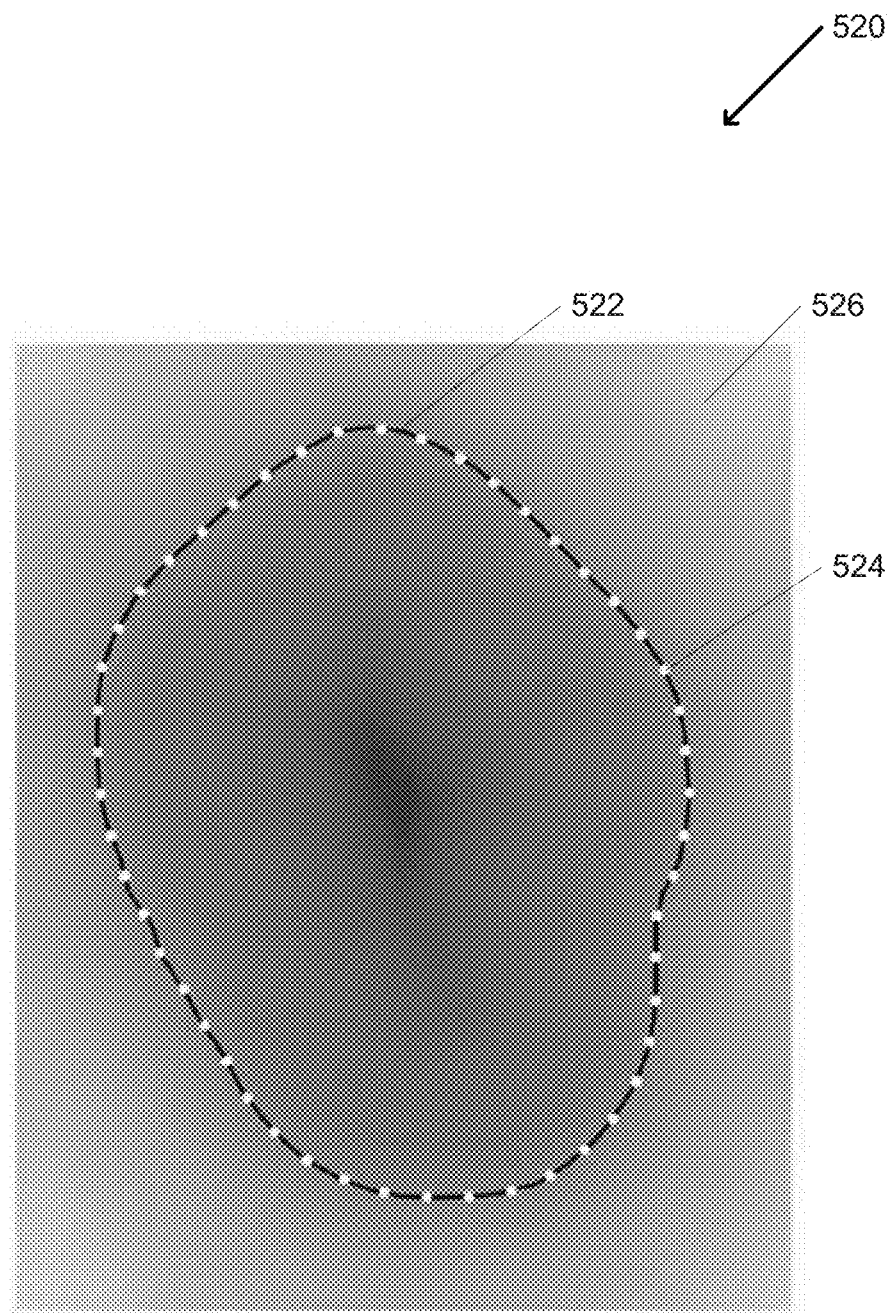
FIG. 5B is a conceptual illustration of the nodes of a grain in accordance with an embodiment of the invention.
Figure 5C:
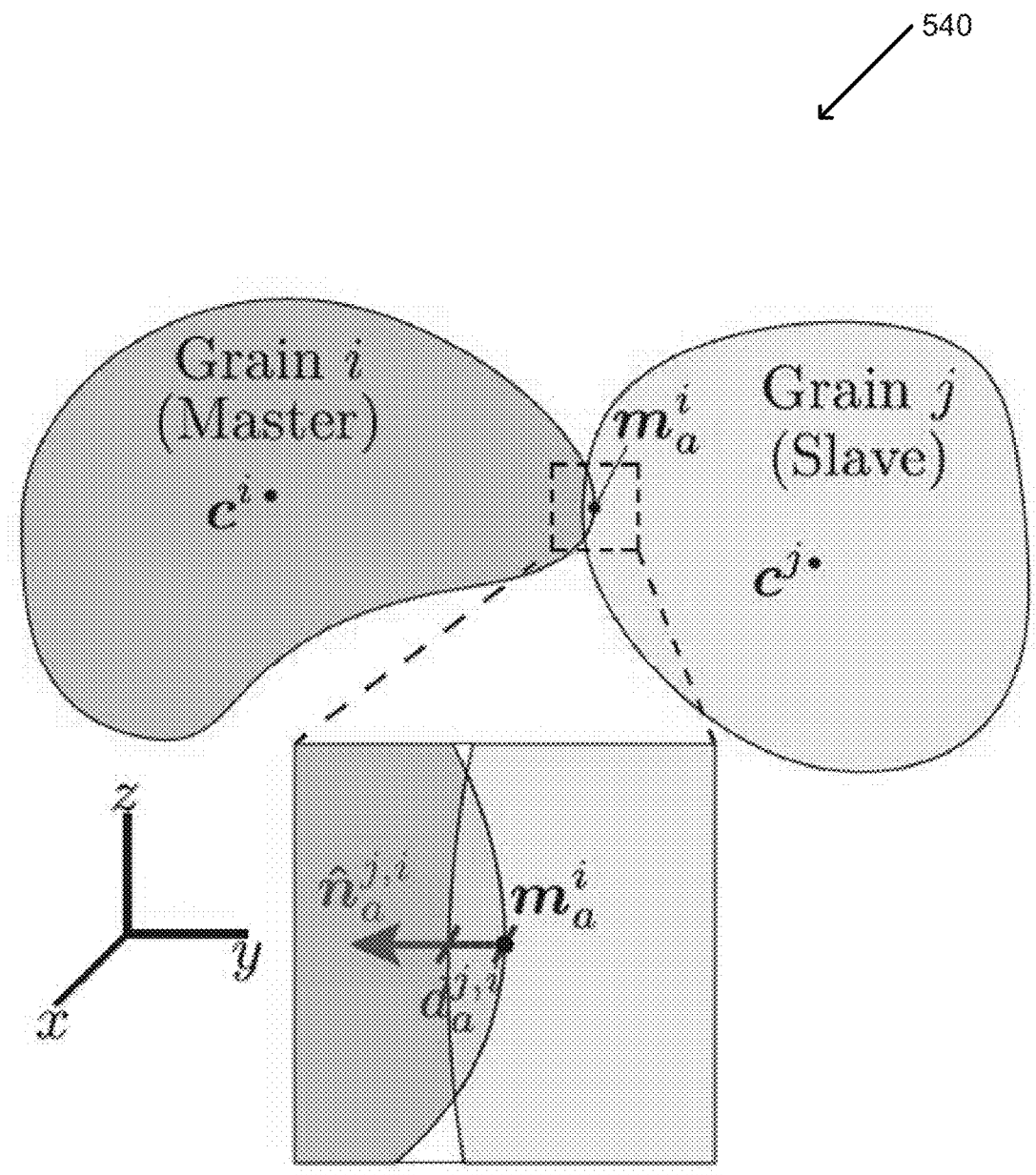
FIG. 5C is a conceptual illustration of an intersection between a master grain and a slave grain in accordance with an embodiment of the invention.

Turning now to FIG. 5C, a conceptual illustration of contacting grains in accordance with an embodiment of the invention is shown. Model 540 includes master grain i and a slave grain j. In many embodiments, if at least one node $m_a^i$ of master grain i is penetrating slave grain j, that is, if $\exists m_a^i \mid \varphi^j(m_a^i) < 0$, then the two grains can be considered in contact, and thus, interparticle forces must be computed. To compute forces from penetrations, any contact model can be used. Any of a variety of contact models can be used to calculate forces from penetrations including (but not limited to) a linear elastic contact model. As an illustrative example, the contact normal force contribution from node $m_a^i$ on grain i is $$F_{n,a}^i = \begin{cases} -k_n d_a^{j,i} \hat{n}_a^{j,i} & \text{if } d_a^{j,i} < 0 \\ 0 & \text{else} \end{cases}$$

where $k_n$ is the normal contact stiffness. By action and reaction, the contribution of contact normal force $F_{n,a}^i$ from node $m_a^i$ on grain j is $$F_{n,a}^j = -F_{n,a}^i$$

The moment $M_{n,a}^i$ contributed by the contact normal force $M_{n,a}^i$ at node $m_a^i$ on grain i is $$M_{n,a}^i = (m_a^i - c^i) \times F_{n,a}^i$$

where $c^i$ is the centroid of grain i. Similarly, the moment $M_{n,a}^j$ contributed by the contact normal force at node $m_a^i$ on grain j is $$M_{n,a}^j = (m_a^i - c^j) \times F_{n,a}^j$$

where $c^j$ is the centroid of grain j. For the calculation of shear and frictional forces, a Coulomb friction model can be utilized, although any of a variety of friction models can be utilized as appropriate to the requirements of specific applications of embodiments of the invention. The relative velocity $v_a$ of node $m_a$ to grain j can be calculated as:

$$v_a = v^i + \omega^i \times (m_a^i - c^i) - v^j - \omega^j \times (m_a^i - c^j)$$

where $v^i$, $v^j$, $\omega^i$, and $\omega^j$ are the translational and angular velocities of grains i and j. The incremental shear displacement $\Delta s_a$ is then $$\Delta s_a = [v_a - (v_a \cdot \hat{n}_a^{j,i}) \hat{n}_a^{j,i}] \Delta t$$

The shear force $F_{s,a}^i$ on grain i contributed by node $m_a^i$ can be updated as such:

$$F_{s,a}^i \leftarrow Z F_{s,a}^i - k_s \Delta s_a$$

where Z is the rotation matrix that rotates the normal vector $\hat{n}_a^{j,i}$ at the current timestep to the normal vector at the previous timestep and $k_s$ is the shear contact stiffness. The Coulomb friction law dictates $F_{s,a}^i$ be capped at a fraction of the normal force $F_{n,a}^i$:

$$F_{s,a}^i \leftarrow \frac{F_{s,a}^i}{\|F_{s,a}^i\|} \min(\|F_{s,a}^i\|, \mu \|F_{n,a}^i\|)$$

where $\mu$ is the interparticle friction coefficient. By action and reaction, $$F_{s,a}^j = -F_{s,a}^i$$

The moment $M_{s,a}^j$ contributed by node $m_a^i$'s shear force on grain i is $$M_{s,a}^i = (m_a^i - c^i) \times F_{s,a}^i$$

Similarly, the moment $M_{s,a}^j$ contributed by node $m_a^i$'s shear force on grain j is $$M_{s,a}^i = (m_a^i - c^j) \times F_{s,a}^j$$

The total contact force on grain i is found by summing all nodal contact forces:

$$F_{tot}^i = \sum_{a=1}^{A} (F_{n,a}^i + F_{s,a}^i)$$

By action and reaction, $$F_{tot}^j = -F_{tot}^i$$

The total contact moment on each grain is found by summing all nodal contact moments:

$$M_{tot}^i = \sum_{a=1}^{A} (M_{n,a}^i + M_{s,a}^i)$$

$$M_{tot}^j = \sum_{a=1}^{A} (M_{n,a}^j + M_{s,a}^j)$$

Given a grain's inertial properties and the force and moment on it, the translational velocity, angular velocity, position, and rotation of the grain are updated using an appropriate time integration scheme. In several embodiments of the invention, known schemes can be used to update the positions of the center of mass and nodes of each grain, so they are not included here for the sake of brevity. It should be noted that, although the illustrated embodiment utilizes the nodes of the master grain and the level set function of the slave grain, many embodiments utilize the level set function of the master grain and the nodes of the slave grain as appropriate to the requirements of those embodiments of the invention.

Turning now to FIG. 5A, a process for determining contact between particles in accordance with an embodiment of the invention is illustrated. The process 500 includes identifying (502) a master particle and identifying (504) one or more slave particles. Nodes and boundaries can be compared (506) and particle intersections can be calculated (508). Nodes in a master particle can be compared (506) against the boundary of a slave particle for penetration. In some embodiments, the master particle has penetrated the slave particle if a negative value is determined and has not made contact with the slave particle if a positive value is determined.

It is important to note that in various embodiments of the invention, to minimize computational cost, the level set function of each grain is never updated as it moves; each level set function remains in a reference configuration. To accommodate this, when computing contact, the nodes $m_a^i$ of grain i (in the global frame) are moved temporarily into the reference configuration of grain j's level set function. From there, contact forces and moments are found (in the reference configuration of grain j) and then moved back to the global frame.

Although a variety of processes for node to surface particle intersection and interaction are described herein with respect to FIGS. 5A-C, any of a variety of processes for determining contact between particles, including those that calculate intersections in three or more dimensions, can be utilized as appropriate to the requirements of specific applications of many embodiments of the invention.

Calculating Shear Banding

Many particle simulations include modeling grains stored within a flexible membrane. Particle simulation processes can include modeling flexible containers along with grains so that when forces are applied to the grains, deformations that occur during the compression of the modeled grains can be calculated as the flexible container follows the deformation of the modeled grains. In many embodiments, the flexible container is a flexible material, such as latex, although any material can be modeled as appropriate to the requirements of specific applications of embodiments of the invention. On the top and bottom of the specimen (that is, the flexible container filled with the grains), the grains are in contact with two discs, one of which, together with a metal cylinder onto which a loading ram pushes, makes up the loading platen. A conceptual illustration of a specimen and its deformation in accordance with an embodiment of the invention is shown in FIG. 6B. The model 620 includes a specimen 622 with a platen 624 on top. The platen 624 is in contact with a ram 626 that is shaped such that, as the ram 626 applies a displacement 628 to the platen 624 and specimen 622, the ram 626 remains in contact with the platen 624 as the specimen 622 deforms.

Particle simulation processes can include compressing the specimen. In a variety of embodiments, the specimen is compressed isotopically by increasing the radial cell pressure with the ram out of contact and then compressed triaxially by keeping the cell pressure constant and prescribing a displacement to the ram. Any of a variety of pressures can be modeled as appropriate to the requirements of specific applications of embodiments of the invention. In several embodiments, air can escape or enter the through a small hole in the ceramic disk opposite the loading platen which gives for drained loading conditions. Membranes and other soft materials such as textiles have been modeled. A conceptual illustration of a membrane model in accordance with an embodiment of the invention is shown in FIG. 6C. The membrane model 640 includes a number of membrane spheres 642, modeling the size and shape of the container material, along with a stiffness model 624 which models the stiffness and/or friction of the membrane spheres. In many embodiments, the size and stiffness of the membrane spheres are calibrated to values that allow them to stay aligned and not form gaps that would let particles escape when the specimen is deformed. The top and bottom rows of membrane spheres can be fixed to their respective platens to represent the friction between the membrane and platens.

When force is applied, the strain of each particle in the specimen can be computed using the following formula:

$$\left(\sum_{p=1}^{N_p} \tilde{x}_n^p \tilde{x}_m^p\right) \alpha_{ni} = \sum_{p=1}^{N_p} d\tilde{u}_i^p \tilde{x}_m^p \ n, m, i = 1, 2, 3$$

where $N_p$ is the number of points, $\tilde{x}^p$ is the deviation of each point's position from the mean position, $d\tilde{u}_i^p$ is the deviation of each point's displacement from the mean displacement, and Cundall's best-fit strain $\in$ is the symmetric part of $\alpha$. The deviatoric invariant $\in_s$ is computed by $$\epsilon_s = \sqrt{\frac{2}{3}} \left\| \epsilon - \frac{1}{3} tr(\epsilon) I \right\|$$

Figure 6A:
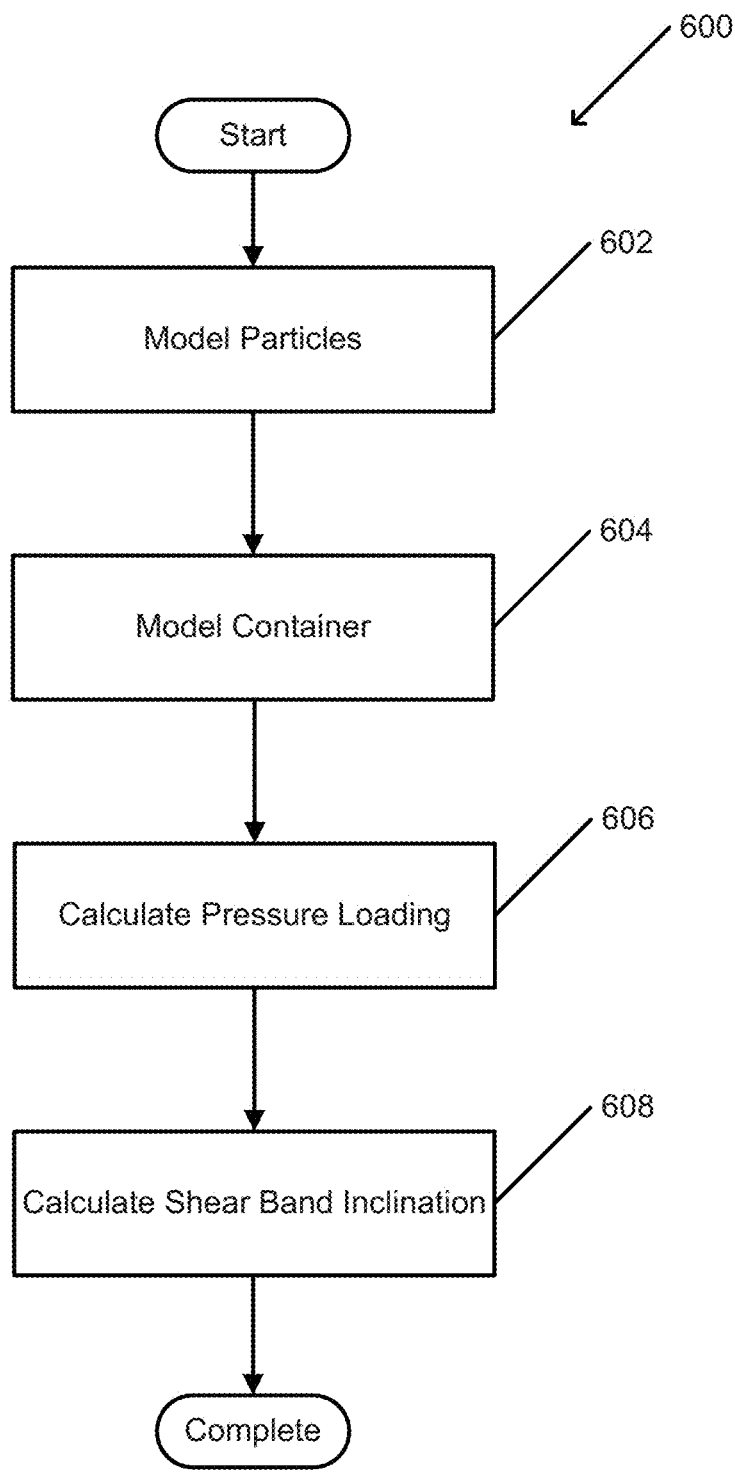
FIG. 6A is a flowchart conceptually illustrating a process for calculating shear bands in accordance with an embodiment of the invention.
Figure 6B:
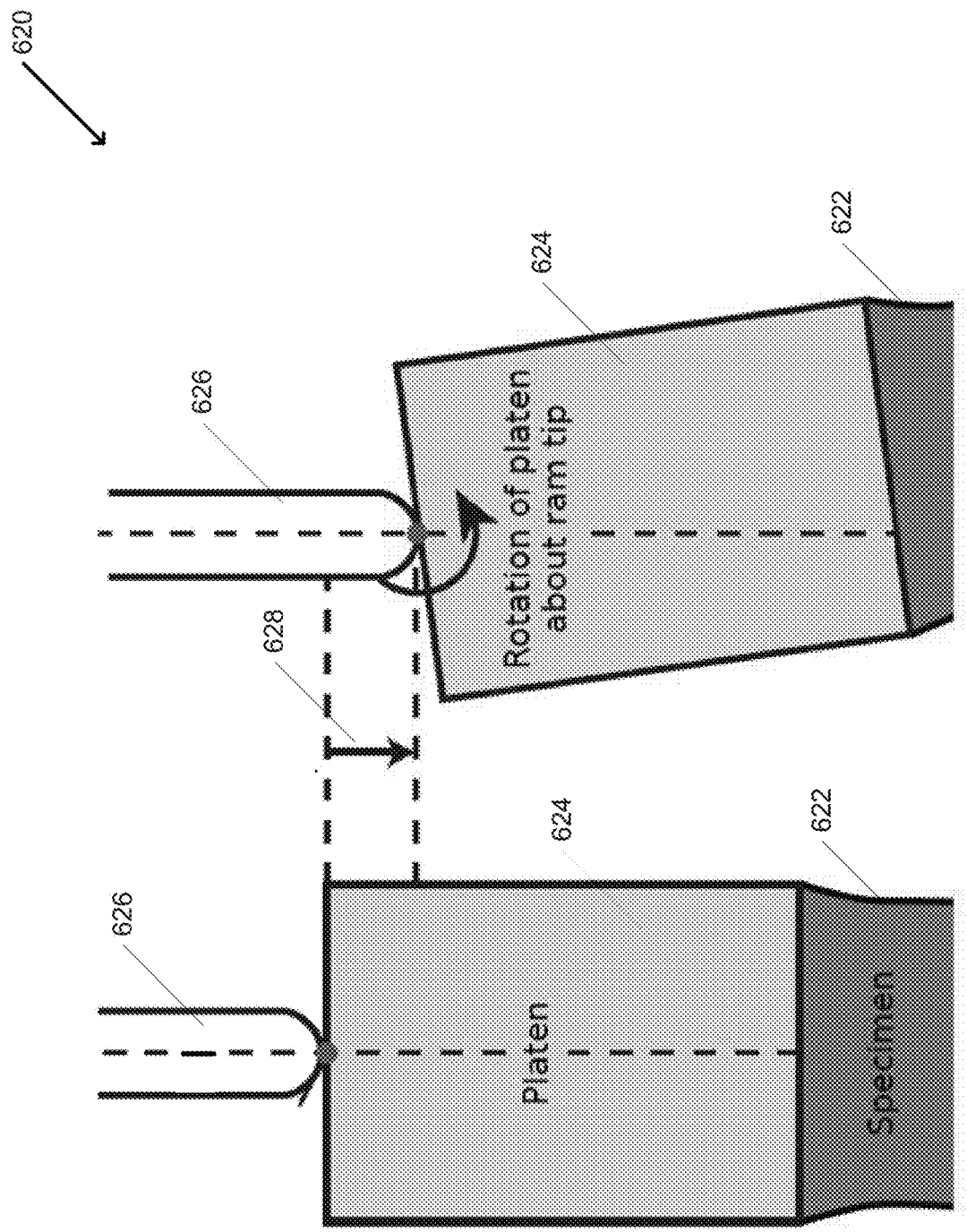
FIG. 6B is a conceptual illustration of a particle simulation model in accordance with an embodiment of the invention.
Figure 6C:
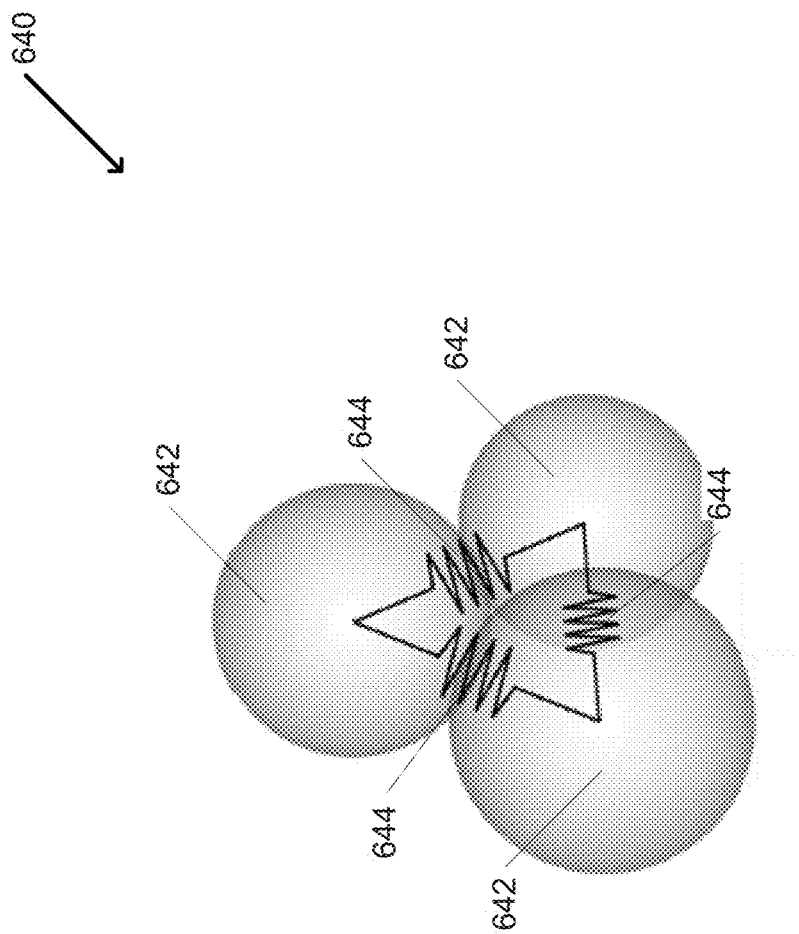
FIG. 6C is a conceptual illustration of a model of a container in accordance with an embodiment of the invention.
Figure 6D:
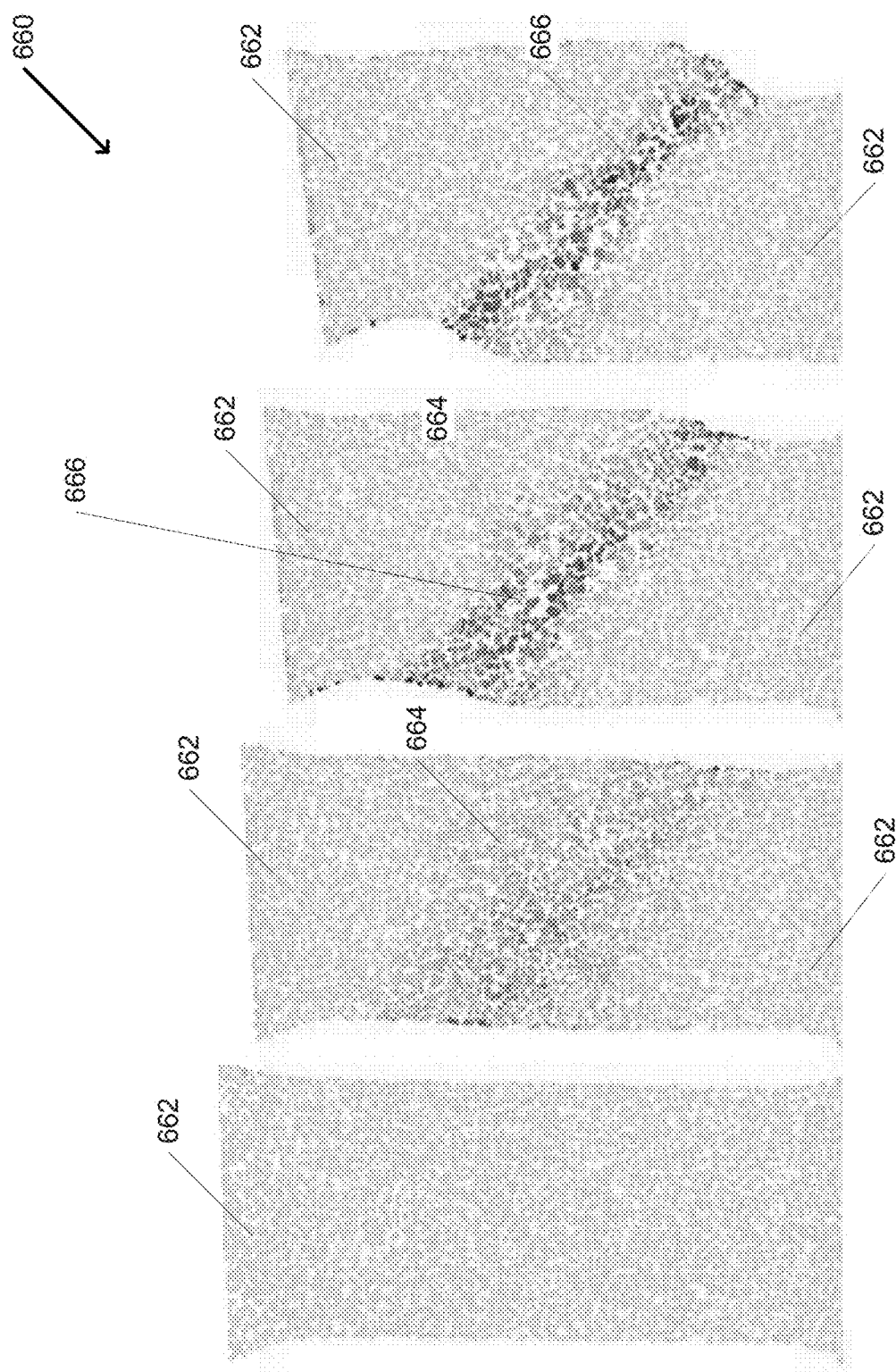
FIG. 6D is a conceptual illustration of the formation of a shear band in accordance with an embodiment of the invention.

A conceptual illustration of axial strain forming in a particle simulation model as pressure is applied in accordance with an embodiment of the invention is shown in FIG. 6D. The particle simulation model 660 includes a set of particles 662 with a low load applied. As pressure is applied to the model 660, the pressure on particles 664 increases until a shear band 666 forms in the specimen.

Figure 6E:
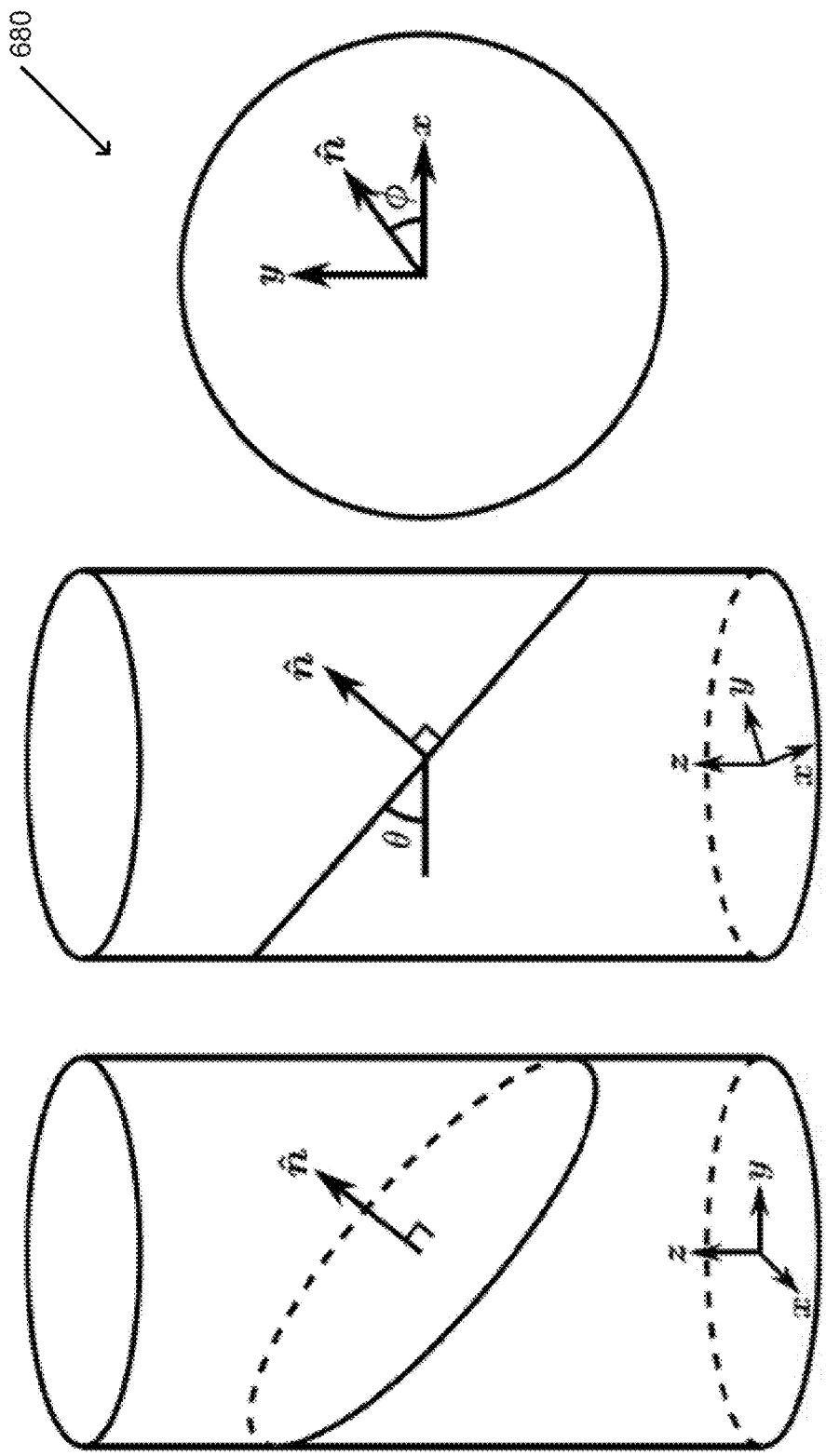
FIG. 6E is a conceptual model of a shear band in accordance with an embodiment of the invention.

Turning now to FIG. 6E, a conceptual illustration of a shear band and its normal n̂ in three dimensional space in accordance with an embodiment of the invention is shown. In the illustrated model 680, z is the direction of loading normal to the x-y plane, the shear band inclination angle θ is measured with respect to the x-y plane, and the shear band orientation angle Ø is measured in the x-y plane.

In many embodiments, the Mohr-Coulomb yield criterion gives the shear band inclination angle, measured from the direction of minimum principal stress, which in a triaxial test is orthogonal to the loading direction, as $$\theta_{MC} = 45° + \frac{\phi_{max}}{2}$$

where $\phi_{max}$ is the maximum friction angle, which is achieved at peak stress.

In several embodiments, the shear band inclination angle $\theta_R$ is calculated by:

$$\theta_R = 45° + \frac{\psi_{max}}{2}$$

where $\psi_{max}$ is the maximum dilatancy angle in the zone of deformation, also achieved at peak stress. In many embodiments, these two solutions differ due to the non-associativity between stress and strain in granular materials; in the case of associativity, the solutions are equal.

In a variety of embodiments, since particle rotations and local deviatoric strains are very large in the shear band, best-fit planes are computed from the positions of particles whose rotations and local deviatoric strains are more than two standard deviations greater than the average incremental rotation and deviatoric strain. In a variety of embodiments, the average stress $\bar{\sigma}$ can be calculated by:

$$\bar{\sigma} = \frac{1}{V} \sum_i^{N_c} F_i \otimes d_i$$

where V is the volume, $N_c$ is the number of contacts in the volume, and F and d are the interparticle force and branch vector, respectively, of each contact. From the average stress, the shear band inclination angle at the peak stress state can be calculated along with the shear band volume and inclination angle.

In many embodiments, the thickness of the shear band can be utilized in the calculation of the properties of the shear band. In granular materials, the thickness of the shear band $t_s$ is typically measured in multiples of the mean particle diameter and can vary with particle shape, specimen porosity, and mean stress. In several embodiments, the thickness of the shear band is 10× the mean particle diameter.

Turning now to FIG. 6A, a process for calculating shear banding in accordance with an embodiment of the invention is shown. The process 600 includes modeling (602) particles, modeling (604) a container, calculating (606) pressure loading, and calculating (608) a shear band inclination. A variety of processes for calculating shear banding is described herein with respect to FIG. 6A-E; however, any of a variety of processes, including those that utilize alternative models for the container and those that utilize alternative techniques for calculating average stress, shear band inclination angles, and/or shear band volume, can be utilized as appropriate to the requirements of specific applications of many embodiments of the invention.

Although the present invention has been described in certain specific aspects, many additional modifications and variations would be apparent to those skilled in the art. In particular, any of the various processes described herein can be performed in alternative sequences and/or in parallel in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A particle simulation device, comprising:
   a processor; and
   a memory storing a particle analysis application;
   wherein the processor, on reading the particle analysis application:
   obtains image data describing a plurality of grains comprising a master grain and a slave grain, wherein the master grain and the slave grain each include a non-uniform shape;
   identifies the master grain within the plurality of grains;
   identifies the slave grain within the plurality of grains;
   models the plurality of grains based on the image data to produce at least one node describing the master grain and a level set function describing the slave grain, wherein the level set function comprises a grid of points, where each point has a value corresponding to its distance from the edge of the slave grain;
   calculates the motion of each of the plurality of grains based on a force applied to the plurality of grains;
   generates a transformed particle model based on the plurality of grains and the calculated motion;
   determines contact between the master grain and the slave grain by calculating a penetration distance between the at least one node of the master grain and the level set function of the slave grain;
   generate a virtual specimen visual representation based on the models of the plurality of grains; and
   display the visual representation including the determined contact between the master grain and the slave grain on a graphical user interface.

2. The particle simulation device of claim 1, wherein the image data is obtained from an imaging device.

3. The particle simulation device of claim 1, wherein the image data is captured using x-ray computed tomographic techniques.

4. The particle simulation device of claim 1, wherein the modeled grain comprises an interpolation of the level set function.

5. The particle simulation device of claim 1, wherein at least one master grain in the plurality of grains comprise a set of nodes.

6. The particle simulation device of claim 1, wherein the motion of the master grain and the slave grain is calculated based on the contact between the master grain and the slave grain.

7. The particle simulation device of claim 1, wherein the processor further generates a model of a flexible container and the plurality of grains are located within the modeled container.

8. The particle simulation device of claim 7, wherein the processor further calculates a shear banding in the transformed particle model.

9. The particle simulation device of claim 1, wherein the force comprises a displacement in three dimensions.

10. A method for simulating particle interactions, comprising:
    obtaining image data describing a plurality of grains comprising a master grain and a slave grain using a particle simulation device comprising a processor and a memory, wherein the master grain and the slave grain each include a non-uniform shape;
    identifying the master grain within the plurality of grains using the particle simulation device;
    identifying the slave grain within the plurality of grains using the particle simulation device;
    modeling the plurality of grains based on the image data using the particle simulation device to produce at least one node describing the master grain and a level set function describing the slave grain, wherein the level set function comprises a grid of points, where each point has a value corresponding to its distance from the edge of the slave grain;
    calculating the motion of each of the plurality of grains based on a force applied to the plurality of grains using the particle simulation device;
    generating a transformed particle model based on the plurality of grains and the calculated motion using the particle simulation device;
    determining contact between the master grain and the slave grain by calculating a penetration distance between the at least one node of the master grain and the level set function of the slave grain using the particle simulation device;
    generating a virtual specimen visual representation based on the models of the plurality of grains; and
    displaying the visual representation including the determined contact between the master grain and the slave grain on a graphical user interface.

11. The method of claim 10, wherein the image data is obtained from an imaging device.

12. The method of claim 10, wherein the image data is captured using x-ray computed tomographic techniques.

13. The method of claim 10, wherein the modeled grain comprises an interpolation of the level set function.

14. The method of claim 10, wherein at least one master grain in the plurality of grains comprise a set of nodes.

15. The method of claim 10, wherein the motion of the master grain and the slave grain is calculated based on the contact between the master grain and the slave grain.

16. The method of claim 10, further comprising generating a model of a flexible container using the particle simulation device, wherein the plurality of grains are located within the modeled container.

17. The method of claim 16, further comprising calculating a shear banding in the transformed particle model using the particle simulation device.

18. The method of claim 10, wherein the force comprises a displacement in three dimensions.

* * * * *